United States Patent
Murphy et al.

(10) Patent No.: US 12,135,023 B2
(45) Date of Patent: Nov. 5, 2024

(54) INPUT/OUTPUT CALIBRATION OF PUMP

(71) Applicant: Blue-White Industries, Ltd., Huntington Beach, CA (US)

(72) Inventors: Patrick Michael Murphy, Irvine, CA (US); Robert E. Gledhill, III, Huntington Beach, CA (US); William M. McDowell, Garden Grove, CA (US); Quang Phan, Garden Grove, CA (US); Jonathan Trong Dinh, Westminster, CA (US)

(73) Assignee: Blue-White Industries, Ltd., Huntington Beach, CA (US)

( * ) Notice: Subject to any disclaimer, the term of this patent is extended or adjusted under 35 U.S.C. 154(b) by 448 days.

(21) Appl. No.: 17/654,206

(22) Filed: Mar. 9, 2022

(65) Prior Publication Data
US 2023/0287881 A1    Sep. 14, 2023

(51) Int. Cl.
*F04B 49/20* (2006.01)
*F04B 43/12* (2006.01)
*F04B 51/00* (2006.01)
*G05B 19/042* (2006.01)
*G05D 7/06* (2006.01)

(52) U.S. Cl.
CPC .............. *F04B 49/20* (2013.01); *F04B 43/12* (2013.01); *F04B 51/00* (2013.01); *G05B 19/0425* (2013.01); *G05D 7/0676* (2013.01); *G05D 7/0682* (2013.01)

(58) Field of Classification Search
CPC ...... F04B 51/00; F04B 49/20; G05B 19/0425; G05D 7/0676; G05D 7/0682

USPC ......................................................... 700/282
See application file for complete search history.

(56) References Cited

U.S. PATENT DOCUMENTS

| | | | | |
|---|---|---|---|---|
| 5,647,733 A * | 7/1997 | Augustyn | ............. | F04B 43/009 417/360 |
| 5,667,368 A * | 9/1997 | Augustyn | ............. | F04B 49/065 417/385 |
| 5,860,793 A * | 1/1999 | Muscarella | ........... | F04B 43/009 417/388 |
| 6,101,456 A * | 8/2000 | Kowatari | .............. | E02F 9/2025 700/282 |
| 6,615,114 B1 * | 9/2003 | Skiba | .................... | G01L 27/005 73/1.01 |
| 7,001,153 B2 | 2/2006 | McDowell et al. | | |
| 7,284,964 B2 | 10/2007 | McDowell et al. | | |

(Continued)

FOREIGN PATENT DOCUMENTS

CN    204458292 U    7/2015

*Primary Examiner* — Christopher S Bobish
(74) *Attorney, Agent, or Firm* — Knobbe, Martens, Olson & Bear, LLP (57) ABSTRACT

A method of calibrating a pump system can include providing a pump, calibrating a pump input with an input device connected to the pump, and calibrating a pump output with an output device connected to the pump. Calibrating the pump input can include selecting a first input signal value, generating a transmitted input signal corresponding to the first input signal value, and setting a nominative pump input value to the first input signal value. Calibrating the pump output can include receiving a received output signal outputted from the pump, and setting a nominative pump output value to the first input signal value.

32 Claims, 11 Drawing Sheets

(56) References Cited

U.S. PATENT DOCUMENTS

| | | | | |
|---|---|---|---|---|
| 7,486,114 B2 * | 2/2009 | Chen | | H04L 25/0274 327/20 |
| 7,558,699 B2 * | 7/2009 | Beck | | F04D 13/10 702/182 |
| 7,979,229 B2 * | 7/2011 | Otaka | | E02F 9/2235 702/98 |
| 8,215,931 B2 | 7/2012 | McDowell et al. | | |
| 8,418,364 B2 | 4/2013 | McDowell et al. | | |
| 8,639,363 B2 | 1/2014 | Gledhill, III et al. | | |
| 9,318,891 B2 * | 4/2016 | Seberger | | H02H 9/02 |
| 9,374,024 B2 | 6/2016 | Nguyen et al. | | |
| 9,389,109 B2 | 7/2016 | Gledhill, III et al. | | |
| 9,777,720 B2 | 10/2017 | Gledhill, III et al. | | |
| 9,828,984 B2 | 11/2017 | Gledhill, III et al. | | |
| 9,909,579 B2 | 3/2018 | Gledhill, III et al. | | |
| 9,996,089 B2 | 6/2018 | Gledhill, III et al. | | |
| 10,330,094 B2 | 6/2019 | Gledhill, III et al. | | |
| 10,480,515 B2 * | 11/2019 | Springer | | F04D 15/0027 |
| 10,496,110 B2 * | 12/2019 | Mou | | G05D 7/0635 |
| 10,948,320 B2 | 3/2021 | Gledhill, III et al. | | |
| 11,131,300 B2 | 9/2021 | Gledhill, III et al. | | |
| 11,150,118 B2 | 10/2021 | Gledhill, III et al. | | |
| 11,221,004 B2 | 1/2022 | Gledhill, III et al. | | |
| 11,261,857 B2 | 3/2022 | Gledhill, III et al. | | |
| D959,238 S | 8/2022 | Nguyen et al. | | |
| 11,402,248 B2 | 8/2022 | Gledhill, III et al. | | |
| 11,485,653 B2 | 11/2022 | Gledhill, III et al. | | |
| 11,578,716 B2 | 2/2023 | Gledhill, III et al. | | |
| 11,639,863 B2 | 5/2023 | Nguyen et al. | | |
| 11,703,362 B2 | 7/2023 | Nguyen et al. | | |
| 11,754,065 B2 | 9/2023 | Nguyen et al. | | |
| 11,768,092 B2 | 9/2023 | Gledhill, III et al. | | |
| 11,768,929 B2 | 9/2023 | Gledhill, III et al. | | |
| 2010/0005655 A1 | 1/2010 | Nguyen | | |
| 2011/0180172 A1 | 7/2011 | Gledhill, III et al. | | |
| 2013/0052556 A1 * | 2/2013 | Maier | | H01M 8/04753 700/282 |
| 2015/0211509 A1 | 7/2015 | Gledhill, III et al. | | |
| 2018/0291886 A1 | 10/2018 | Gledhill, III et al. | | |
| 2018/0298891 A1 | 10/2018 | Gledhill, III et al. | | |
| 2020/0386593 A1 | 12/2020 | Nguyen et al. | | |
| 2021/0054963 A1 | 2/2021 | Nguyen et al. | | |
| 2021/0064735 A1 | 3/2021 | Gledhill, III et al. | | |
| 2021/0324845 A1 | 10/2021 | Nguyen et al. | | |
| 2021/0348602 A1 | 11/2021 | Nguyen et al. | | |
| 2022/0099083 A1 | 3/2022 | Gledhill, III et al. | | |
| 2022/0276082 A1 | 9/2022 | Gledhill, III et al. | | |
| 2022/0316463 A1 | 10/2022 | Gledhill, III et al. | | |
| 2023/0015391 A1 | 1/2023 | Nguyen et al. | | |

* cited by examiner

INPUT/OUTPUT CALIBRATION OF PUMP

BACKGROUND

Field

The present disclosure relates generally to calibration of pumps. More particularly, the present disclosure relates to pump systems with improved calibration and methods of calibrating a pump system.

Description of the Related Art

Pumps can be used to deliver fluids (e.g., liquid chemicals) for a variety of applications, including industrial, aquatic, and municipal applications. Pumps can be connected to other equipment. There is a need to calibrate the pumps with the connected devices.

SUMMARY

Pumps can create pressure to move fluids. A pump can include a motor that runs based on input signals. As an example, a relatively low input signal, such as a low current, can cause a motor to run at a relatively low speed, and a relatively high input signal, such as a high current, can cause a motor to run at a relatively high speed. By changing the signal sent to the pump, users can desirably control the speed of the pump.

Users can connect a pump in their system including one or more devices to remotely control the speed of the pump, e.g., by changing the signal sent to the pump. Users may measure the signal at different locations in their system (e.g., at the location remotely controlling the pump and/or at the location of the pump). The signal may change by the time it reaches the pump and/or reaches other equipment connected to the pump. If users do not measure an expected value for the signal they send or receive, they may adjust their systems. However, some such adjustments may be unnecessary if the pump is calibrated with the other equipment.

Various implementations provide a method of calibrating a pump system. The method can include providing a pump, calibrating a pump input with a signal source connected to the pump, and calibrating a pump output with an output meter connected to the pump. Calibrating the pump input can include selecting a first input signal value, generating a transmitted input signal corresponding to the first input signal value, measuring a received input signal value, and setting a nominative pump input value corresponding to the received input signal value, such that the nominative pump input value is the first input signal value. Calibrating the pump output can include receiving a received output signal outputted from the pump, measuring a received output signal value, and setting a nominative pump output value corresponding to the received output signal value, such that the nominative pump output value is the first input signal value.

In various implementations, the method can further include calibrating the pump input for a second input signal value. In various implementations, the method can further include calibrating the pump output for the second input signal value.

In some instances, the first input signal value and the second input signal value can correspond to minimum and maximum input signal values which can control the pump.

In some methods, the first input signal value can correspond to a value in the range of 2-6 mA and the second input signal value can correspond to a value in the range of 18-22 mA. For example, the first input signal value can correspond to 4 mA and the second input signal value can correspond to 20 mA.

In some instances, calibrating the pump input can further comprise setting the pump to run at a speed in the range of 0-20% speed when the pump is set at the first input signal value and setting the pump to run at a speed in the range of 80-100% speed when the pump is set at the second input signal value.

For example, calibrating the pump input can further comprise setting the pump to run at 0% speed when the pump is set at the first input signal value and setting the pump to run at 100% speed when the pump is set at the second input signal value.

In some methods, measuring the received input signal value can comprise measuring the received input signal value at the pump.

In some instances, the method can further include displaying the nominative pump output value.

Various implementations provide a pump system. The pump system can include a pump and a processor in communication with the pump. The pump can be connected to a signal source configured to generate a transmitted input signal corresponding to a first input signal value. The transmitted input signal can have a received input signal value. The pump can be further connected to an output meter configured to measure a received output signal value. The processor can be configured to calibrate a pump input by setting a nominative pump input value corresponding to the received input signal value, such that the nominative pump input value is the first input signal value. The processor can also be configured to calibrate a pump output with the output meter by setting a nominative pump output value corresponding to the received output signal value, such that the nominative pump output value is the first input signal value.

In various implementations, the processor can be configured to calibrate the pump input for a second input signal value. In various implementations, the processor can be configured to calibrate the pump output for the second input signal value.

In some instances, the first input signal value and the second input signal value can correspond to minimum and maximum input signal values which can control the pump.

In some systems, the first input signal value can correspond to a value in the range of 2-6 mA and the second input signal value can correspond to a value in the range of 18-22 mA. For example, the first input signal value can correspond to 4 mA and the second input signal value can correspond to 20 mA.

In some instances, the processor can be further configured to set the pump to run at a speed in the range of 0-20% speed when the pump is set at the first input signal value and to set the pump to run at a speed in the range of 80-100% speed when the pump is set at the second input signal value.

For example, the processor can be further configured to set the pump to run at 0% speed when the pump is set at the first input signal value and to set the pump to run at 100% speed when the pump is set at the second input signal value.

In some instances, the system can further include a display configured to present the nominative pump output value.

In some systems, the pump can be a peristaltic pump.

In some instances, the system can further comprise an input meter configured to measure the received input signal value. In some instances, the input meter can be configured to measure the received input signal value at the pump.

In some instances, the system can further comprise the output meter configured to measure the received output signal value.

Various implementations provide a method of calibrating a pump system. The method can include providing a pump, calibrating a pump input with an input device connected to the pump, and calibrating a pump output with an output meter connected to the pump. Calibrating the pump input can include selecting a first input signal value; generating a transmitted input signal corresponding to the first input signal value, and setting a nominative pump input value to the first input signal value. Calibrating the pump output can include receiving a received output signal outputted from the pump, and setting a nominative pump output value to the first input signal value.

In various implementations, the method can further include calibrating the pump input for a second input signal value. In various implementations, the method can further include calibrating the pump output for the second input signal value.

In some instances, the first input signal value and the second input signal value can correspond to minimum and maximum input signal values which can control the pump.

In some methods, the first input signal value can correspond to a value in the range of 2-6 mA and the second input signal value can correspond to a value in the range of 18-22 mA. For example, the first input signal value can correspond to 4 mA and the second input signal value can correspond to 20 mA.

In some instances, calibrating the pump input can further comprise setting the pump to run at a speed in the range of 0-20% speed when the pump is set at the first input signal value and setting the pump to run at a speed in the range of 80-100% speed when the pump is set at the second input signal value.

For example, calibrating the pump input can further comprise setting the pump to run at 0% speed when the pump is set at the first input signal value and setting the pump to run at 100% speed when the pump is set at the second input signal value.

In some instances, the method can further include displaying the nominative pump output value.

BRIEF DESCRIPTION OF THE DRAWINGS

The features disclosed herein are described below with reference to the drawings of some implementations. The illustrated implementations are intended to illustrate, but not to limit the inventions. The drawings contain the following figures.

DETAILED DESCRIPTION

While the present description sets forth specific details of various implementations, it will be appreciated that the description is illustrative only and should not be construed in any way as limiting. Furthermore, various applications of such implementations and modifications thereto, which may occur to those who are skilled in the art, are also encompassed by the general concepts described herein.

Figure 1:
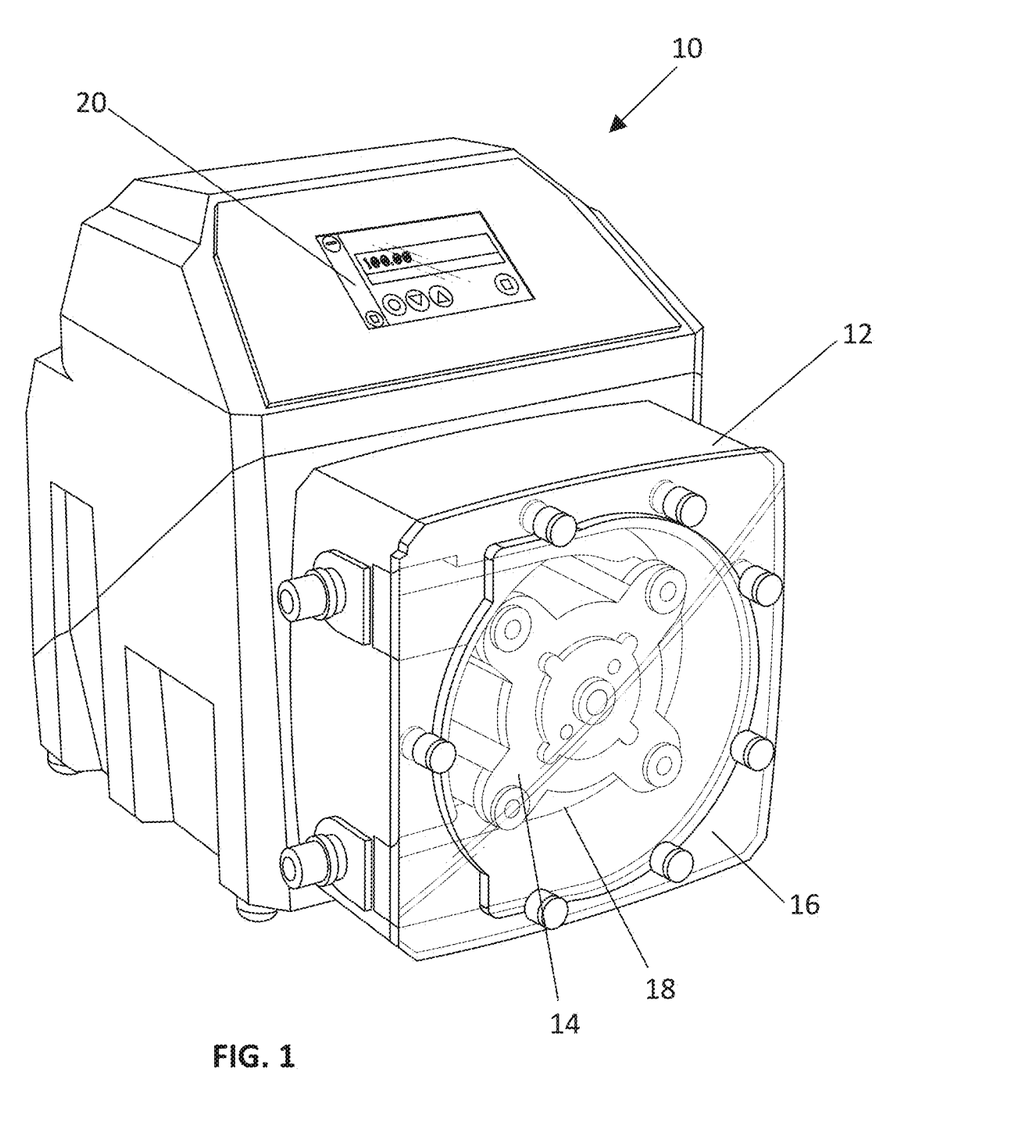
FIG. 1 is a perspective view of an example pump that can be calibrated according to various implementations described herein.

As described herein, a pump can be calibrated with other devices connected to the pump, e.g., devices connected to the input and/or output of the pump. FIG. 1 is a perspective view of an example pump 10 that can be calibrated according to various implementations described herein. The illustrated pump 10 is a peristaltic pump. However, other types of pumps can be calibrated as described herein. In various implementations, the pump 10 can have a pump head 12 that includes a rotor 14 surrounded by a housing 16. The rotor 14 can compress a pump tubing 18 against the housing 16 in a peristaltic squeezing action as the rotor 14 rotates, thereby driving fluid through the pump tubing 18. The dimensions of the pump tubing 18 and the rotational speed of the rotor 14 can determine the volumetric output of the pump 10.

Figure 2:
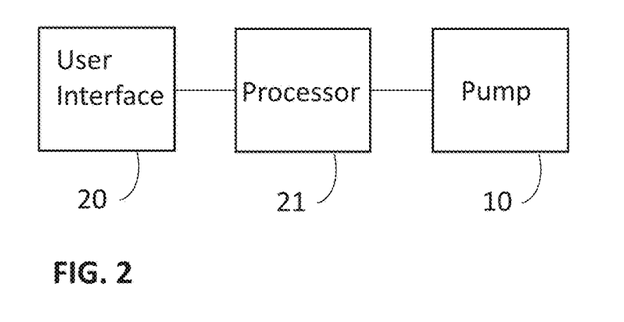
FIG. 2 is a block diagram illustrating an example connection between a user interface in communication with a pump via a processor.

The pump 10 can include a user interface 20 to allow a user to control and/or configure the pump 10 (e.g., via a processor, such as processing electronics, in communication with the pump 10). In this example, the user interface 20 (and connected processor) is integrated with the pump 10. In other examples, the user interface 20 (and/or connected processor) may be separate from the pump 10. For simplicity, FIG. 2 is a block diagram illustrating an example connection between the user interface 20 in communication with the pump 10 via a processor 21.

Figure 3:
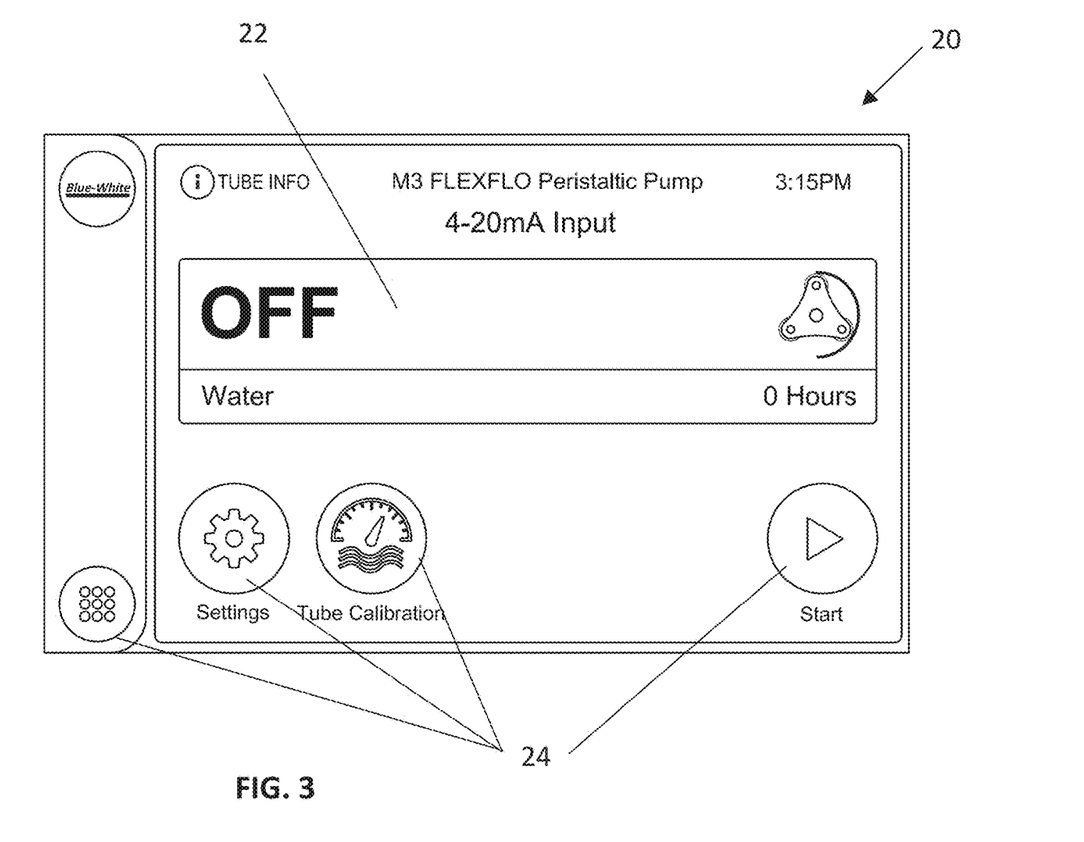
FIG. 3 shows an example user interface used to calibrate a pump according to various implementations described herein.

FIG. 3 shows an example user interface 20. In some implementations, the user interface 20 can include a display 22 (e.g., LCD display, LED display, an OLED display, etc.). The display 22 can present various information and/or operational parameters, for example, pump name, time, tube information, pump status, fluid being pumped, rotation direction, run time, etc.

The user interface 20 can allow the user to control operational parameters of the pump, such as the rotational speed of the rotor 14 via an electronic speed-control system. For example, the user interface 20 can include one or more input stations 24 (e.g., buttons, switches, dials, etc.). In some aspects, the one or more input stations 24 can be arranged as one or more buttons on the display 22 (e.g., one or more buttons on a touch screen display). In some aspects, the one or more input stations 24 can be arranged as a membrane keypad. Other examples are possible. The speed-control system can include a processor, e.g., a microprocessor, configured to receive a command signal from the one or more input stations 24 and transmit a control signal to an electric motor of the pump 10 (which controls the rotor 14) based on the command signal received from the one or more input stations 24. In this way, the speed-control system can allow a user to adjust an operational parameter of the pump 10 through the user interface 20. The processor 21 can include processing electronics. An example processor that can be used include ST's STM32F401 microcontroller. In some instances, it can use an ARM Cortex M4 CPU. The processor can convert an analog signal (e.g., mA) into a digital signal that is processed into a motor revolutions per minute (rpm) at which to run the pump. The processor can perform other functions as well. The main circuit board of the pump 10 can receive the signal inputs from the processor 21 and drive the motor at a determined speed accordingly.

In various implementations, the user interface 20 can access the processor 21 to control the pump 10 local to the pump 10. In various implementations, the pump 10 can additionally or alternatively be controlled at a location remote from the pump 10. For example, the user interface 20 can configure the pump 10 to allow the user to remotely control the pump 10 with incoming signals. As will be described herein, the user interface 20 can set one or more input signals for one or more given operational parameters (e.g., motor speed, flow rate, revolutions per minute, etc.).

Figure 4A:
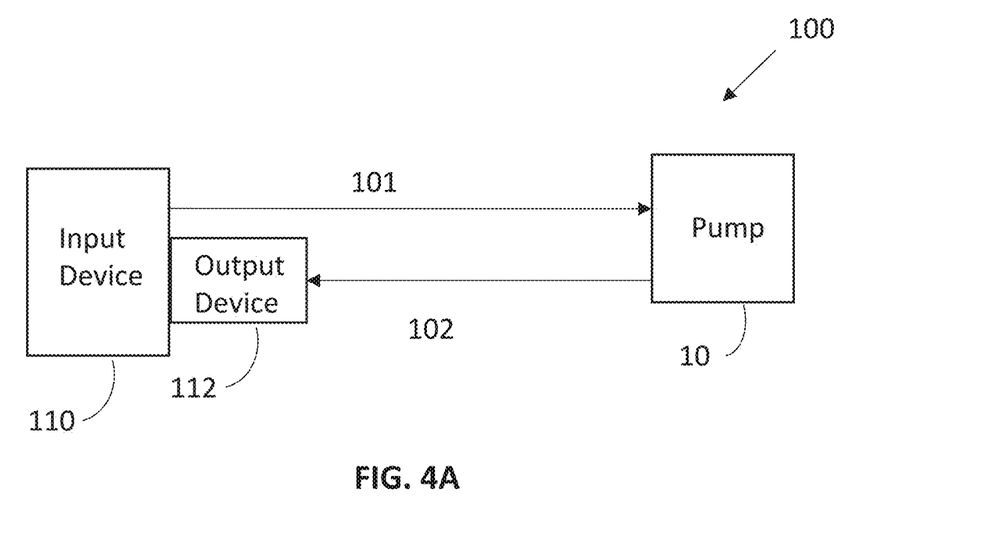
FIGS. 4A and 4B schematically illustrate example pump systems including a pump that can be connected to input and output devices.

FIG. 4A schematically illustrates an example pump system 100 including a pump 10 that can be connected to an input device 110 used to remotely control the pump 10. The input device 110, such as a remote control, can include a signal source and can be configured to generate a transmitted input signal 101. An example input device 110 can include a multimeter, such as a Fluke 789 ProcessMeter, which can provide the input signal to control the pump. In various instances, the input device 110 can receive a first input signal value selected by the user, and can generate a transmitted input signal 101 corresponding to the first input signal value. The pump 10 can receive a received input signal 101 which can be used to control the pump 10.

With continued reference to FIG. 4A, the pump 10 can also be connected to an output device 112. In some examples, the output device 112 can be an output meter, e.g., a multimeter in some instances, located at the remote location near the input device 110. The output device 112 can be separate or integrated with the input device 110. The output device 112 can be configured to measure a received output signal 102 from the pump 10 so as to determine a received output signal value. If the received output signal value is not equal to the first input signal value, the user may adjust equipment in the system. However, in various implementations, the pump 10 can be calibrated to account for the difference between the first input signal value and the received output signal value, reducing the need for adjustments.

Figure 4B:
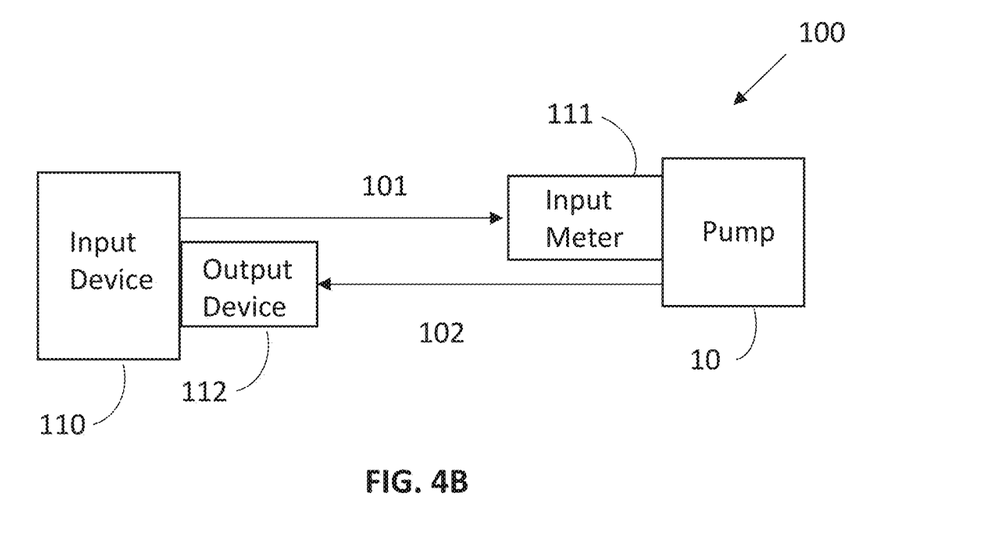

FIG. 4B schematically illustrates another example pump system 100, which is similar to that in FIG. 4A, but including an additional device such as an input meter 111 at or near the location of the pump 10 to measure a received input signal value corresponding to the transmitted input signal 101. The input meter 111, e.g., a multimeter in some instances, can be separate or integrated with the pump 10. In some variations, the input meter 111 can be located anywhere along the path before or at the input of the pump 10. In some variations, the output meter 112 can also be located anywhere along the path after the output of the pump 10.

Figure 5:
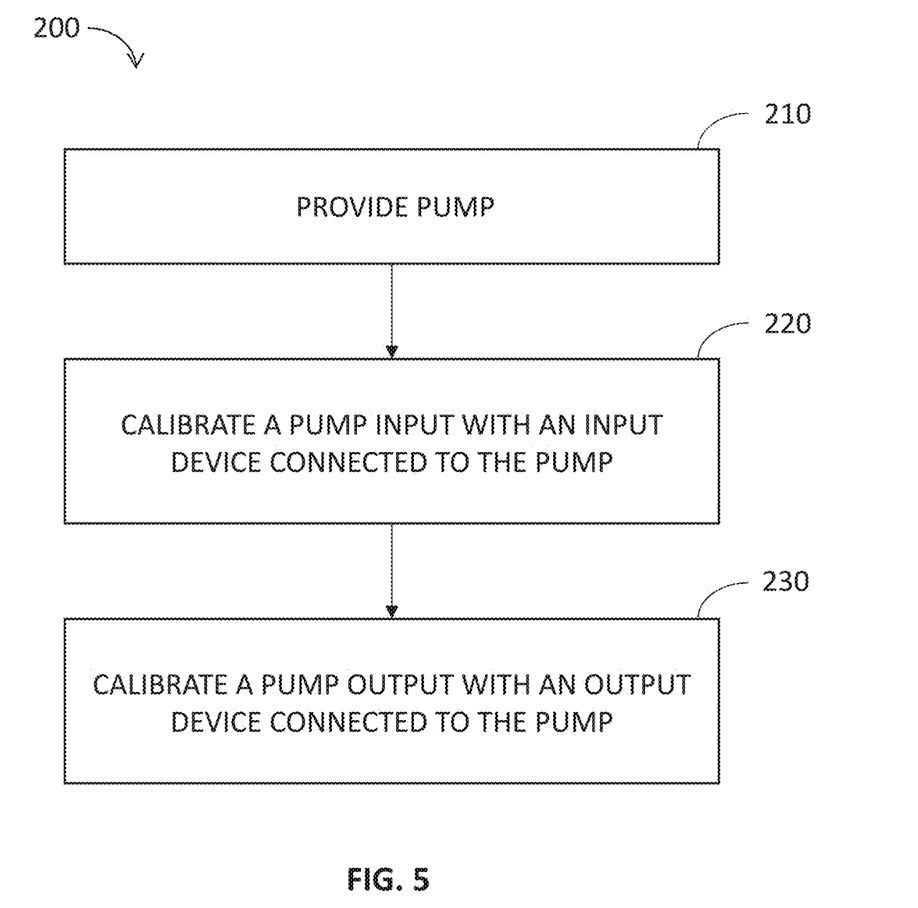
FIG. 5 is a flowchart of an example method of calibrating a pump system.
Figure 6:
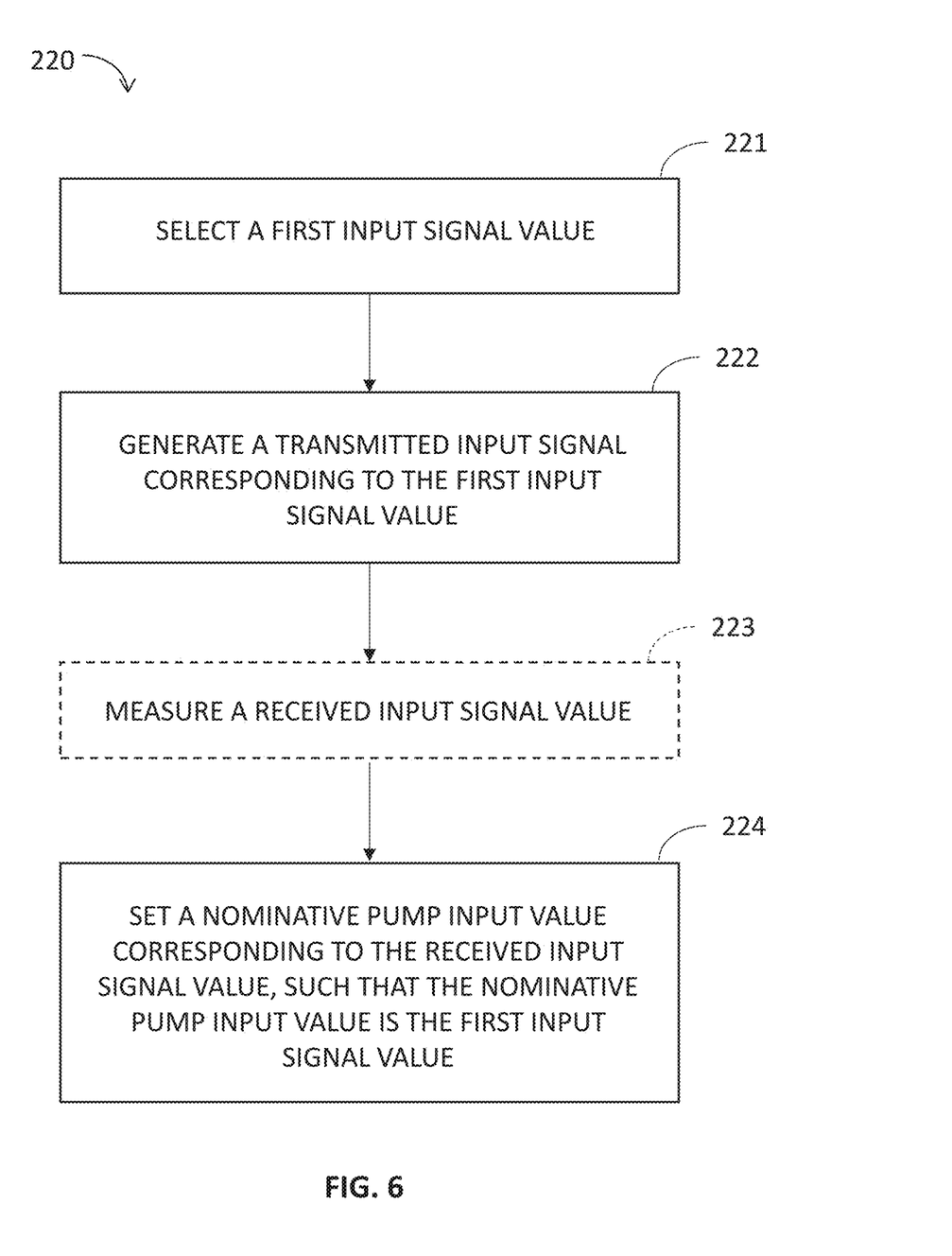
FIG. 6 is a flowchart of an example method of calibrating a pump input with an input device connected to the pump.
Figure 12:
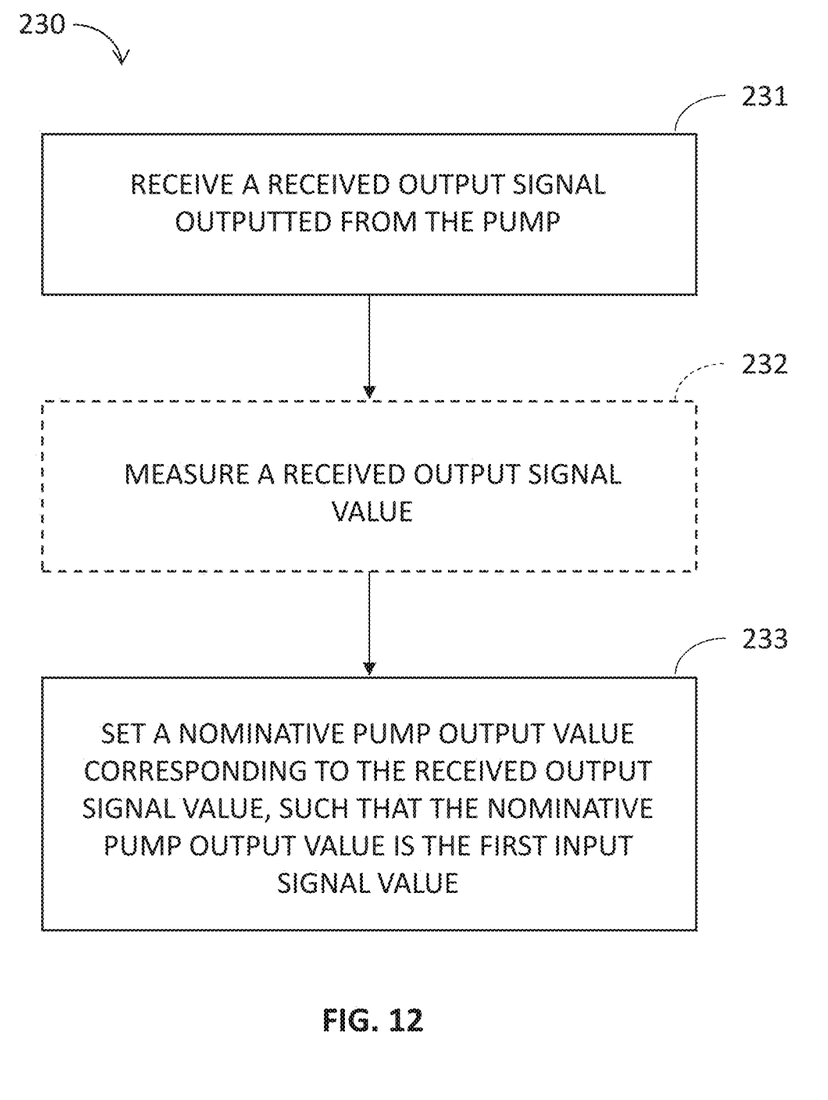
FIG. 12 is a flowchart of an example method of calibrating a pump output with an output device connected to the pump.
Figure 13:
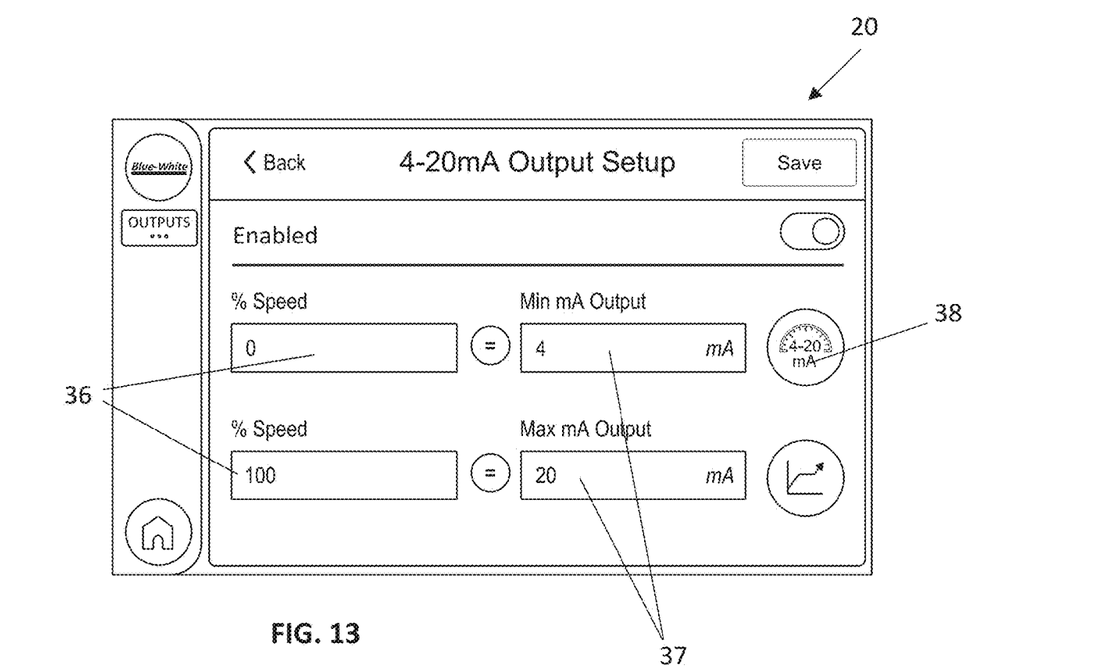
FIGS. 13, 14, 15 and 16 show examples of various steps of an example method of calibrating a pump output.
Figure 14:
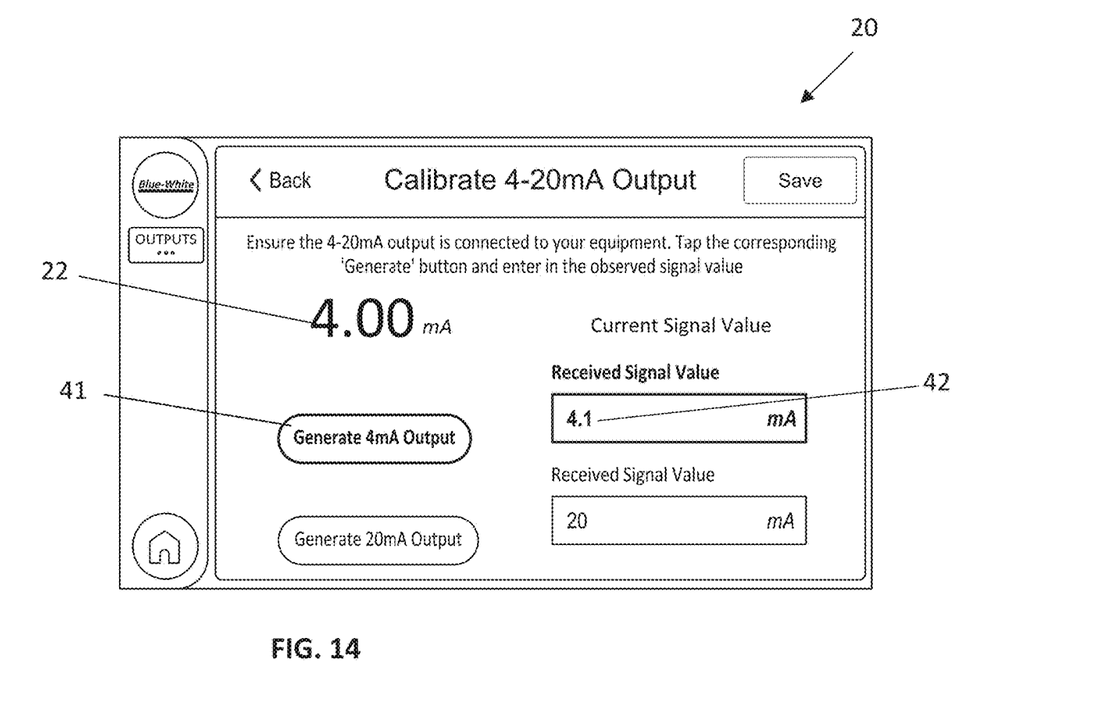

FIG. 5 shows a flowchart of an example method of calibrating a pump system. The method 200 can include providing a pump, as shown in block 210. As described herein, the pump can be a peristaltic pump as shown in FIG. 1 or other type of pump. As shown in block 220, the method 200 can include calibrating a pump input with an input device connected to the pump, as shown in block 220, and calibrating a pump output with an output device connected to the pump, as shown in block 230. FIG. 6 is a flowchart of an example method of calibrating the pump input, with examples of the various steps shown in FIGS. 7-11. FIG. 12 is a flowchart of an example method of calibrating the pump output, with examples of the various steps shown in FIGS. 13-16. In various implementations, the processor can be configured to perform any one or more of the method steps described herein to calibrate the pump input and/or pump output. In various instances, the processor can be configured to execute one or more software applications, e.g., one or more software applications on a computer-readable medium.

Figure 7:
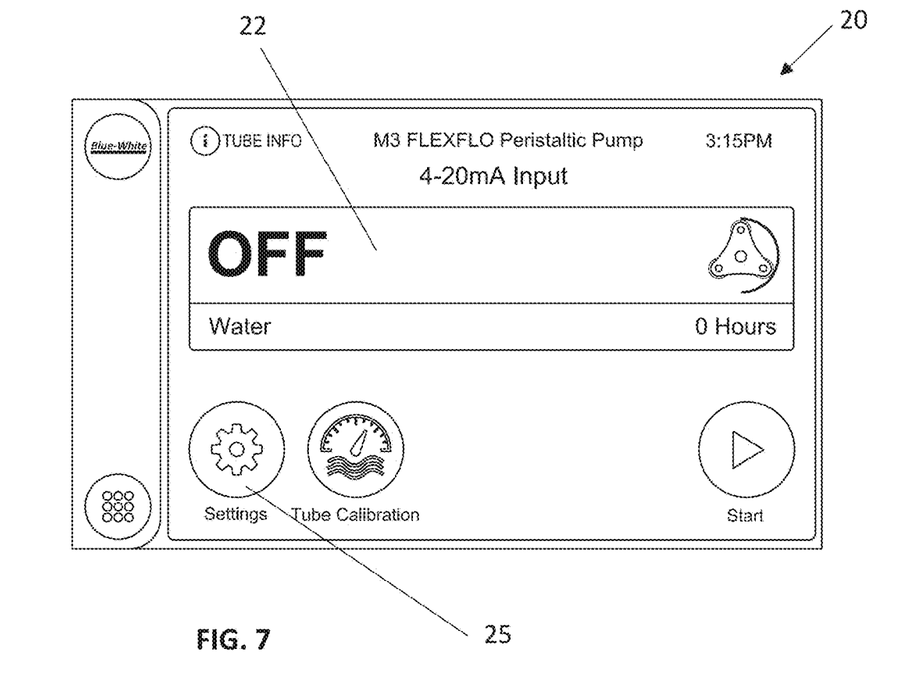
FIGS. 7, 8, 9, 10, and 11 show examples of various steps of an example method of calibrating a pump input.
Figure 8:
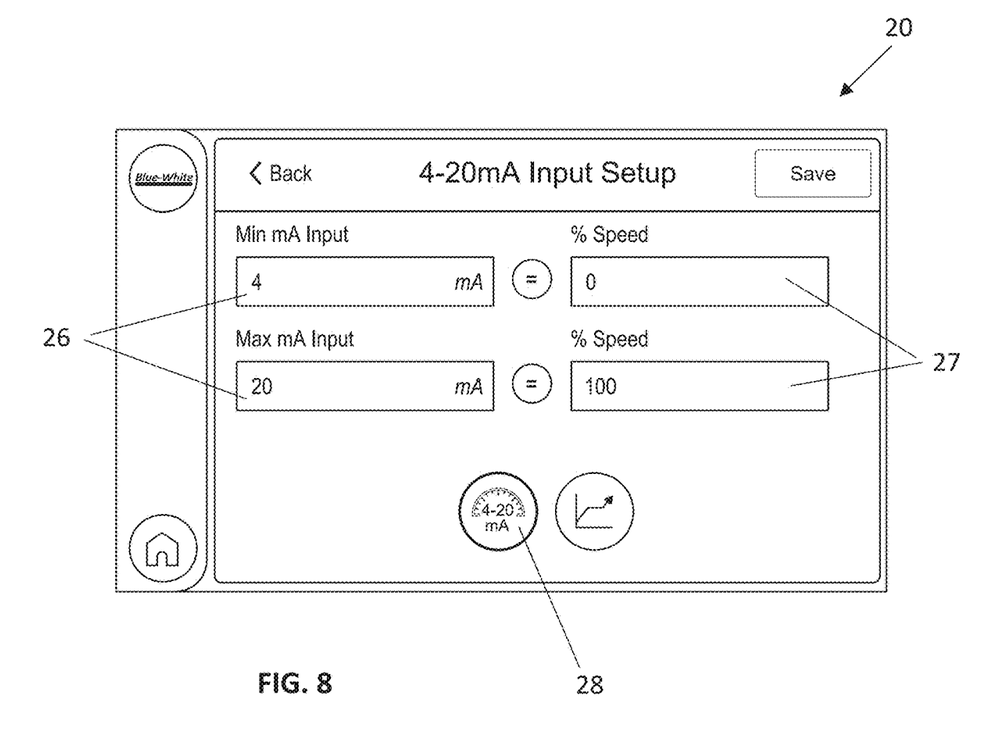
Figure 9:
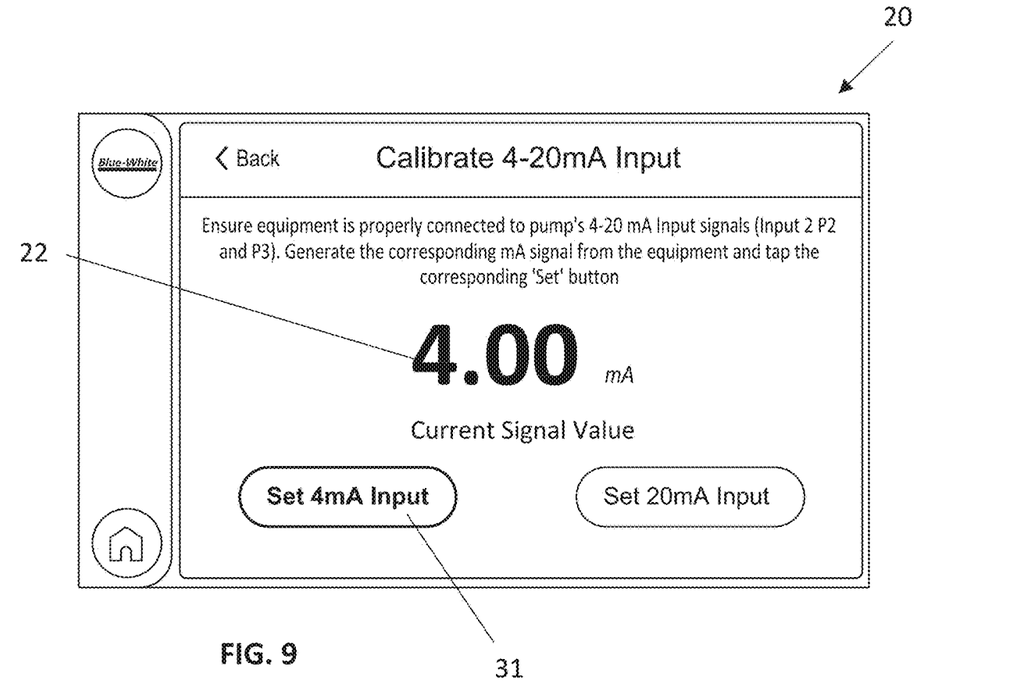
Figure 10:
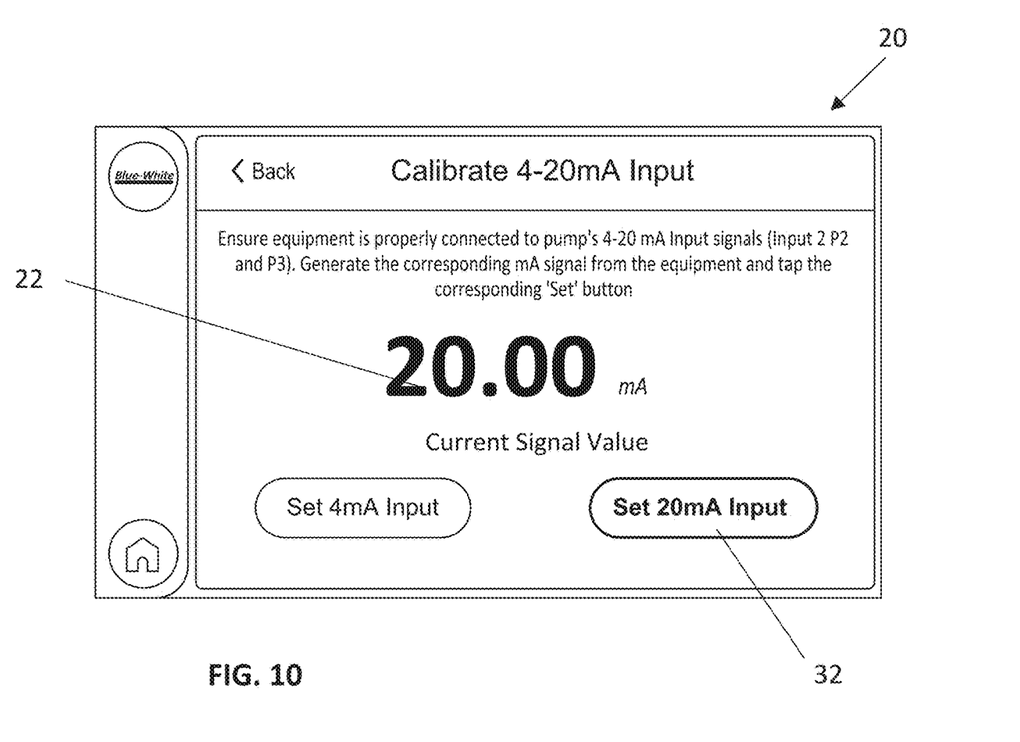
Figure 11:
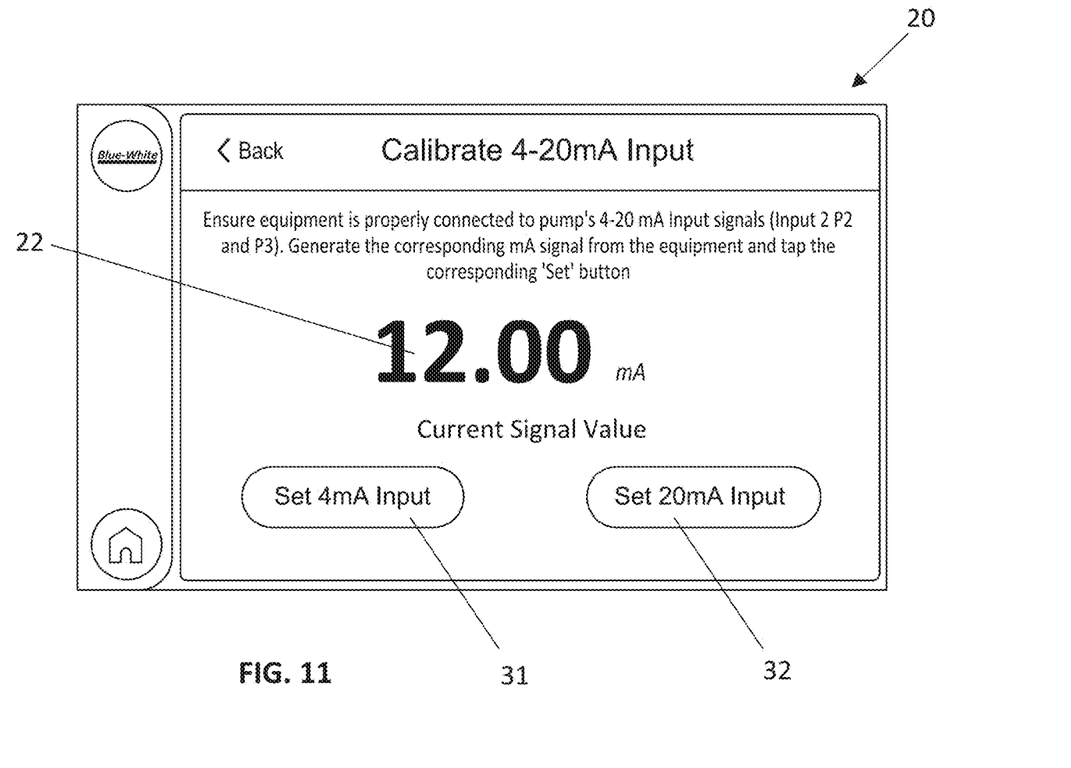

To begin calibration, as shown in FIG. 7, the user can select one of the input stations 25 (e.g., Settings button) on the display 22 of the user interface 20 of the pump 10. In FIG. 8, the user can configure the pump 10 to respond to incoming signals in a certain manner. For example, the user can set one or more input signal values for one or more given operational parameters (e.g., motor speed, flow rate, revolutions per minute, etc.). In some instances, the pump 10 can be calibrated for a range of input signal values, such as input signal values corresponding to the minimum and maximum input signal values for the pump 10. In various examples, the input signal value can be set for a certain motor speed, flow rate, or revolutions per minute. For example, the pump 10 can be configured to set the minimum and maximum input signal values to 0% and 100% speed of the pump respectively.

The input signal value is not particularly limited and can have any value for the particular application. In some instances, the input signal value can be a value in the range of 0-25 mA (e.g., 0 mA, 0.5 mA, 1 mA, 2 mA, 3 mA, 4 mA, . . . 20 mA, 21 mA, 22 mA, 23 mA, 24 mA, 25 mA, etc.) or in any range therebetween (e.g., 0.5 mA-25 mA, 1 mA-24 mA, 2 mA-23 mA, 3 mA-22 mA, 4 mA-20 mA, etc.). In some instances, the motor speed can be any percentage in the range of 0-100% speed (e.g., 0%, 1%, 2%, 3%, 4%, 5%, . . . 95%, 96%, 97%, 98%, 99%, 100%, etc.) or in any range therebetween.

In the example shown in FIG. 8, the user can set two input signal values 26 to operate at two different motor speeds 27. In particular, the user can set the pump to run at 0% speed when the pump receives a first received input signal and set the pump to run at 100% speed when the pump receives the second received input signal. The example shows a 4 mA received input signal equal to 0% motor speed and a 20 mA received input signal equal to 100% motor speed. As set forth herein, other examples are possible. For example, at the low end, the input signal value can correspond to a value in the range of 0-6 mA, 1-6 mA, 2-6 mA (e.g., 0.5 mA, 1 mA, 1.5 mA, 2 mA, 2.5 mA, 3 mA, 3.5 mA, 4 mA, 4.5 mA, 5 mA, 5.5 mA, 6 mA, etc.), or in any range formed by any of these values. As another example, at the high end, the input signal value can correspond to a value in the range of 18-22 mA, 18-24 mA, 18 mA-25 mA (e.g., 18 mA, 19 mA, 20 mA, 21 mA, 22 mA, 23 mA, 24 mA, 25 mA), or in any range formed by any of these values.

In some instances, the user may set only one received input signal to correspond to a given motor speed (e.g., 50% motor speed, 75% motor speed, 100% motor speed, etc.). As another example, the user may set three input signal values for three different motor speeds. In some instances, the user can set one or more input signal values, not necessarily the minimum or maximum input signal value, to an operational parameter, not necessarily the minimum or maximum for the operational parameter. In various instances, a linear relationship can define the relationship between the input signal value and the operational parameter. In other instances, a non-linear relationship can define the relationship between the input signal value and the operational parameter.

In some examples, when initially configuring the pump 10, the user interface 22 can display a default or a previously used setting, which can be changed by the user. After the intended configuration is inputted, the user can select an appropriate input station 28 to accept the configuration and proceed to input calibration.

With reference to FIG. 6, the method 220 of calibrating the pump input can include selecting a first input signal value, as shown in block 221, and generating a transmitted input signal corresponding to the first input signal value, as shown in block 222. In the example shown in FIG. 9, the user interface 20 on the pump 10 can prompt the user to ensure the equipment (e.g., input device 110 shown in FIGS. 4A and 4B) is properly connected to the pump 10 and to generate a transmitted input signal (e.g., transmitted input signal 101 shown in FIGS. 4A and 4B) corresponding to the first input signal value. In the example shown in FIG. 9, the input device 110 can generate a transmitted input signal 101 corresponding to the first input signal value of 4 mA (e.g., the minimum input signal value in this example).

Referring back to FIG. 6, the method can optionally include measuring the received input signal value, as shown in block 223. For example, an input meter 111 (e.g., as shown in FIG. 4B) can measure the received input signal 101 so as to determine the received input signal value. Although the user may have intended to send an 4 mA input signal, the actual received input signal value may deviate from this value, e.g., the actual received input signal value may be 4.1 mA or 3.9 mA.

Referring back to FIG. 6, the method can include setting a nominative pump input value corresponding to the received input signal value, such that the nominative pump input value is the first input signal value, as shown in block 224. For example, the pump 10 can have a nominative pump input value corresponding to the received input signal value. However, to calibrate the pump input with the input device 110, the nominative pump input value can be set to the first input signal value. In the example shown in FIG. 9, the nominative pump input value can be set to a 4.00 mA Current Signal Value as shown on the display 22 by selecting the appropriate input station 31 (Set 4 mA Input). Accordingly, when the user sends an intended signal of 4 mA, the pump 10 can be calibrated such that the nominative pump input value is 4.00 mA. In other words, the received input signal value, which may or may not be 4.00 mA, can be calibrated as 4.00 mA as expected by the user.

As described herein, the method 220 can include calibrating the pump input for a second input signal value. In the example shown in FIG. 10, the input device 110 can generate a transmitted input signal 101 for an input signal value of 20 mA (e.g., the maximum input signal value in this example). By selecting an appropriate input station 32 (Set 20 mA Input), the nominative pump input value can be set to a 20.00 mA Current Signal Value as shown on the display 22. Accordingly, when the user sends an intended signal of 20 mA, the pump 10 can be calibrated such that the nominative pump input value is 20.00 mA. In other words, the received input signal value, which may or may not be 20.00 mA, can be calibrated as 20.00 mA as expected by the user.

In various implementations, the processor can be configured to not calibrate the pump input when the received input signal value (e.g., measured from the input meter 111 shown in FIG. 4B) is greater than a threshold value from the selected input signal value (e.g., too far off from the expected value). For example, the processor may not calibrate the pump input when the received input signal value is greater than 1 mA, 1.5 mA, 2 mA, 2.5 mA, 3 mA, etc. from the selected input signal value. In the example shown in FIG. 11, the input stations 31, 32 to set the nominative pump input value are not selectable if the received input signal value (e.g., shown as 12.00 mA on the display 22) is far off (e.g., greater than +/−1 mA in this example) from the one or more selected input signal values (e.g., 4 mA or 20 mA).

The method can also calibrate the pump output with an output device. In various implementations, the user can configure the pump 10 such that the output device 112 shown in FIGS. 4A and 4B responds as expected to the received output signals 102. In the example shown in FIG. 13, the user can indicate one or more operational parameters 36 (e.g., speed, flow rates, revolutions per minute, etc.) that operate at a certain signal value 37. For example, the user can set two motor speeds that operate at two different signal values. In particular, the user can set the minimum and maximum motor speeds to the minimum and maximum signal values, respectively. The example shows that the pump runs at 0% motor speed when the pump receives 4 mA input signal and that the pump runs at 100% motor speed when the pump receives 20 mA input signal, which are the responses expected by the user based on the input configuration shown in FIG. 8. The user can select an appropriate input station 38 to accept the configuration and proceed to output calibration.

With reference to FIG. 12, the method 230 of calibrating the pump output can include receiving a received output signal outputted from the pump, as shown in block 231. In the example shown in FIG. 14, the user interface 20 on the pump 10 can prompt the user to ensure the equipment (e.g., output device 112 shown in FIGS. 4A and 4B) is properly connected to the pump 10 and to generate an output signal (e.g., the received output signal 102 shown in FIGS. 4A and 4B) from the pump 10. In this example, the pump 10 can generate an output signal corresponding to the motor speed at which it operated.

Referring back to FIG. 12, the method 230 can optionally include measuring the received output signal value, as shown in block 232. For example, an output device such as an output meter 112 (e.g., as shown in FIGS. 4A and 4B) can measure the received output signal 102 so as to determine the received output signal value. The received output signal value may or may not equal the selected input signal value (or the transmitted signal value). For example, the user may enter 4 mA as the first input signal value, and the received output signal value may be 4.1 mA.

With continued reference to FIG. 12, the method 230 can include setting a nominative pump output value corresponding to the received output signal value, such that the nominative pump output value is the first input signal value, as shown in block 233. For example, the pump 10 can have a nominative pump output value corresponding to the signal value of the signal 102 received by the output device 112, e.g., the received output signal value. However, to calibrate the pump output with the output device 112, the nominative pump output value can be set to the first input signal value. To calibrate the pump output, in the example shown in FIG. 14, the user can select the appropriate input station 41 (Generate 4 mA Output) to generate the output signal from the pump 10. In some instances, the user can enter the received output signal value in the allocated space 42 on the display 22 (e.g., measured as 4.1 mA in this example).

Figure 15:
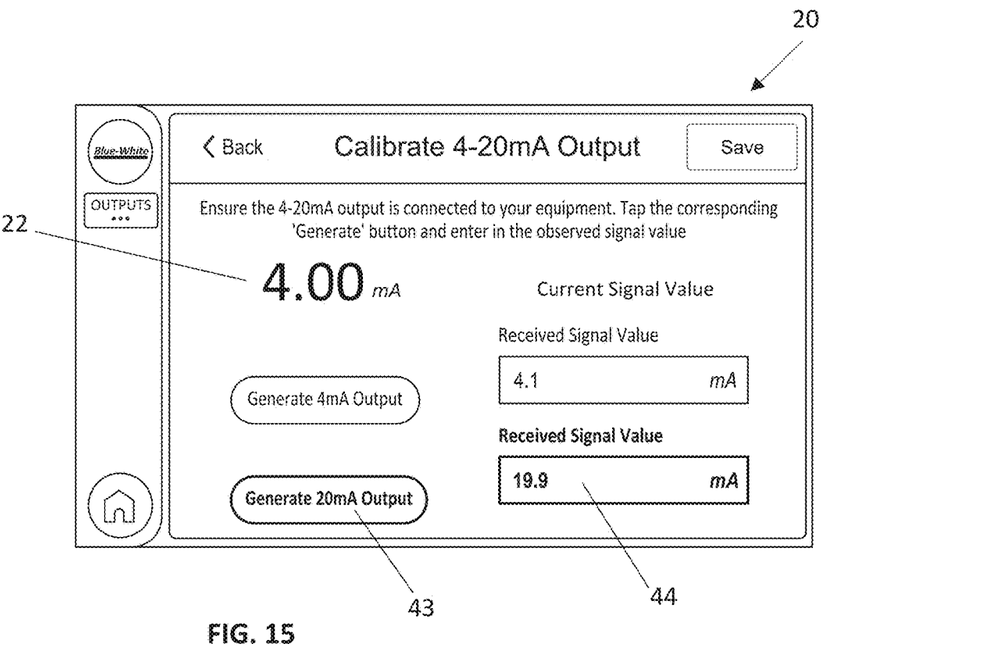

As described herein, in the example shown in FIG. 15, the pump output can be calibrated for a second output signal value. The user can select the appropriate input station 43 (Generate 20 mA Output) to generate a second output signal from the pump 10. In this example, the user can enter the received output signal value in the allocated space 44 on the display 22 (e.g., measured as 19.9 mA in this example).

Figure 16:
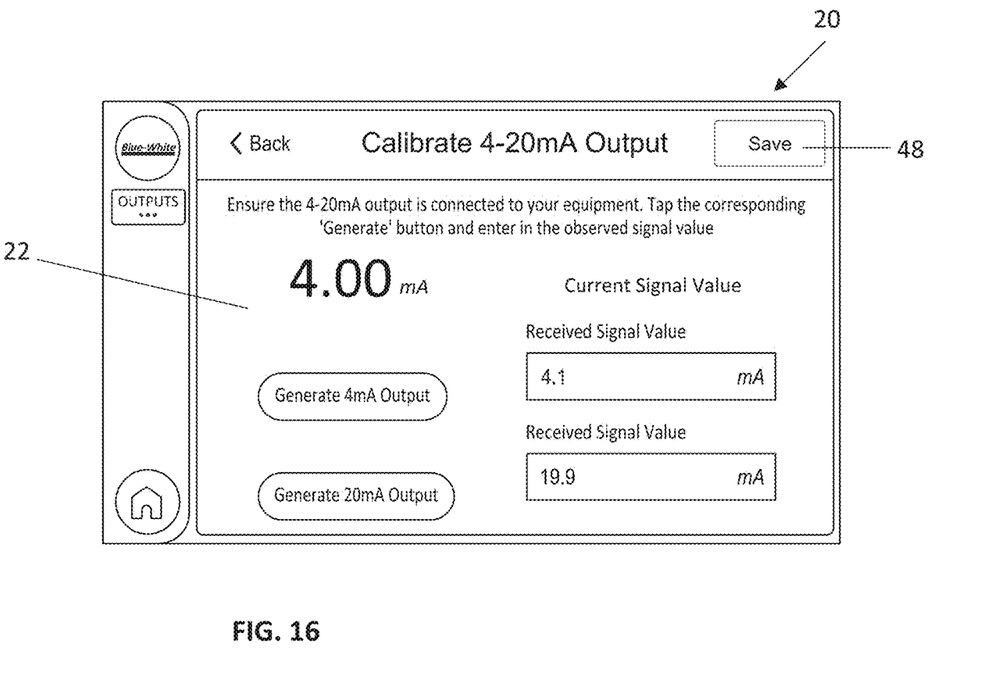

In the example shown in FIG. 16, the user can select the appropriate input station 48 (Save) on the display 22 to save the calibrated values into the pump 10. As such, the processor can set a nominative pump output value corresponding to the received output signal value, such that the nominative pump output value is the selected input signal value (e.g., as shown as 4.00 mA Current Signal Value on the display 22). Accordingly, when the user sends an intended signal of 4 mA, the pump 10 can be calibrated such that the nominative pump input value is 4.00 mA and the nominative pump output value is also 4.00 mA. In other words, the actual received output signal value, which may or may not be 4.00 mA, can be calibrated as 4.00 mA. In some examples, the pump system can further include a display (e.g., on the output device 112) to present the nominative pump output value. In various implementations, when a user enters a certain input signal value (e.g., 4 mA), the pump input and pump output can be calibrated so that when the user receives the nominative pump output value (e.g., 4.00 mA), the user can know that the pump is working as expected and thus, reducing the need for unnecessary adjustments.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A method of calibrating a pump system, the method comprising:
   providing a pump;
   (a) calibrating a pump input with a signal source connected to the pump, wherein calibrating the pump input comprises:
      selecting a first input signal value;
      generating a transmitted input signal corresponding to the first input signal value;
      measuring a received input signal value; and
      setting a nominative pump input value corresponding to the received input signal value, such that the nominative pump input value is the first input signal value; and
   (b) calibrating a pump output with an output meter connected to the pump, wherein calibrating the pump output comprises:
      receiving a received output signal outputted from the pump;
      measuring a received output signal value; and
      setting a nominative pump output value corresponding to the received output signal value, such that the nominative pump output value is the first input signal value.

2. The method of claim 1, further comprising calibrating the pump input for a second input signal value.

3. The method of claim 2, further comprising calibrating the pump output for the second input signal value.

4. The method of claim 3, wherein the first input signal value and the second input signal value correspond to minimum and maximum input signal values which can control the pump.

5. The method of claim 3, wherein the first input signal value corresponds to a value in the range of 2-6 mA and the second input signal value corresponds to a value in the range of 18-22 mA.

6. The method of claim 5, wherein the first input signal value corresponds to 4 mA and the second input signal value corresponds to 20 mA.

7. The method of claim 3, wherein calibrating the pump input further comprises setting the pump to run at a speed in the range of 0-20% speed when the pump is set at the first input signal value and setting the pump to run at a speed in the range of 80-100% speed when the pump is set at the second input signal value.

8. The method of claim 4, wherein calibrating the pump input further comprises setting the pump to run at 0% speed when the pump is set at the first input signal value and setting the pump to run at 100% speed when the pump is set at the second input signal value.

9. The method of claim 1, wherein measuring the received input signal value comprises measuring the received input signal value at the pump.

10. The method of claim 1, further comprising displaying the nominative pump output value.

11. A pump system comprising:
   a pump connected to a signal source configured to generate a transmitted input signal corresponding to a first input signal value, the transmitted input signal having a received input signal value, the pump further connected to an output meter configured to measure a received output signal value; and
   a processor in communication with the pump,
   wherein the processor is configured to calibrate a pump input by setting a nominative pump input value corresponding to the received input signal value, such that the nominative pump input value is the first input signal value, and
   wherein the processor is configured to calibrate a pump output with the output meter by setting a nominative pump output value corresponding to the received output signal value, such that the nominative pump output value is the first input signal value.

12. The system of claim 11, wherein the processor is configured to calibrate the pump input for a second input signal value.

13. The system of claim 12, wherein the processor is configured to calibrate the pump output for the second input signal value.

14. The system of claim 13, wherein the first input signal value and the second input signal value correspond to minimum and maximum input signal values which can control the pump.

15. The system of claim 13, wherein the first input signal value corresponds to a value in the range of 2-6 mA and the second input signal value corresponds to a value in the range of 18-22 mA.

16. The system of claim 15, wherein the first input signal value corresponds to 4 mA and the second input signal value corresponds to 20 mA.

17. The system of claim 13, wherein the processor is further configured to set the pump to run at a speed in the range of 0-20% speed when the pump is set at the first input signal value and to set the pump to run at a speed in the range of 80-100% speed when the pump is set at the second input signal value.

18. The system of claim 14, wherein the processor is further configured to set the pump to run at 0% speed when the pump is set at the first input signal value and to set the pump to run at 100% speed when the pump is set at the second input signal value.

19. The system of claim 11, further comprising a display configured to present the nominative pump output value.

20. The system of claim 11, wherein the pump is a peristaltic pump.

21. The system of claim 11, further comprising an input meter configured to measure the received input signal value.

22. The system of claim 21, wherein the input meter is configured to measure the received input signal value at the pump.

23. The system of claim 11, further comprising the output meter configured to measure the received output signal value.

24. A method of calibrating a pump system, the method comprising:
 providing a pump;
 (a) calibrating a pump input with an input device connected to the pump, wherein calibrating the pump input comprises:
  selecting a first input signal value;
  generating a transmitted input signal corresponding to the first input signal value; and
  setting a nominative pump input value to the first input signal value; and
 (b) calibrating a pump output with an output device connected to the pump, wherein calibrating the pump output comprises:
  receiving a received output signal outputted from the pump; and
  setting a nominative pump output value to the first input signal value.

25. The method of claim 24, further comprising calibrating the pump input for a second input signal value.

26. The method of claim 25, further comprising calibrating the pump output for the second input signal value.

27. The method of claim 26, wherein the first input signal value and the second input signal value correspond to minimum and maximum input signal values which can control the pump.

28. The method of claim 26, wherein the first input signal value corresponds to a value in the range of 2-6 mA and the second input signal value corresponds to a value in the range of 18-22 mA.

29. The method of claim 28, wherein the first input signal value corresponds to 4 mA and the second input signal value corresponds to 20 mA.

30. The method of claim 26, wherein calibrating the pump input further comprises setting the pump to run at a speed in the range of 0-20% speed when the pump is set at the first input signal value and setting the pump to run at a speed in the range of 80-100% speed when the pump is set at the second input signal value.

31. The method of claim 27, wherein calibrating the pump input further comprises setting the pump to run at 0% speed when the pump is set at the first input signal value and setting the pump to run at 100% speed when the pump is set at the second input signal value.

32. The method of claim 24, further comprising displaying the nominative pump output value.

\* \* \* \* \*